United States Patent [19]
Lethellier

[11] Patent Number: 6,094,038
[45] Date of Patent: Jul. 25, 2000

[54] BUCK CONVERTER WITH INDUCTIVE TURN RATIO OPTIMIZATION

[75] Inventor: Patrice R. Lethellier, Oxnard, Calif.

[73] Assignee: Semtech Corporation, Newbury Park, Calif.

[21] Appl. No.: 09/340,575

[22] Filed: Jun. 28, 1999

[51] Int. Cl.[7] .................................. G05F 1/56; G05F 1/40
[52] U.S. Cl. ............................................. 323/282; 323/271
[58] Field of Search ..................................... 323/222, 223, 323/226, 271, 273, 282

[56] References Cited

U.S. PATENT DOCUMENTS

| | | | |
|---|---|---|---|
| 5,552,695 | 9/1996 | Schwartz | 323/271 |
| 5,592,071 | 1/1997 | Brown | 323/282 |
| 5,721,483 | 2/1998 | Kolluri et al. | 323/224 |
| 5,929,692 | 1/1997 | Carsten | 323/282 |

*Primary Examiner*—Matthew Nguyen
*Attorney, Agent, or Firm*—D'Alessandro & Ritchie

[57] ABSTRACT

A DC—DC power converter circuit for converting relatively high input voltages to relatively low output voltages employs a buck-type circuit topology with a multiple winding inductor. An optional winding is provided to the inductor to clamp a voltage spike appearing on the drain of one of the switching devices. Optionally, two inductor windings may be capacitively coupled for better efficiency.

24 Claims, 4 Drawing Sheets

BUCK CONVERTER WITH INDUCTIVE TURN RATIO OPTIMIZATION

BACKGROUND OF THE INVENTION

1. Field of the Invention

The present invention is directed to DC—DC switched mode power converters utilizing buck-type converter circuits.

2. The Background

Switched mode DC—DC power converters are common in the electronics industry. They are frequently used to convert one available DC level voltage to another DC level voltage, often needed for a particular set of semiconductor chips.

Such power converters generally use one or more electrically controlled switches (such as N- or P-Channel MOSFETs) the gates of which are controlled by a switched mode power supply controller circuit which is often integrated onto a single chip.

As electronic devices become faster, smaller and more portable, the need for increased electrical efficiency in DC—DC converters used in these devices is becoming more important. Energy wasted in portable electronics devices prematurely drains the battery powering the device and creates waste heat which must be managed. Relatively small increases in overall electrical efficiency—such as from 75% to 85%—result in a major decrease in wasted power and waste heat—e.g., from 25% to 15%.

Turning now to FIG. 1A, a buck converter circuit known in the art is shown. An input voltage is applied between the input terminals denoted Vin and GND. GND may be any fixed potential such as 0 volts DC relative to Vin. An input capacitor C1 preferably filters the input. Switch Q1 which is shown as an N-Channel MOSFET conducts current from Vin to node 10 when the gate of Q1 is powered by switching signal SS on line 12 from switched mode controller 14. Switched mode controller 14 may itself be powered from Vin and GND or another convenient power source. SENSE input on line 16 provides an indication of the output voltage Vout to controller 14 so that it may adjust the duty cycle of the switching signal SS to adjust Vout to a pre-programmed output voltage. The preprogrammed output voltage may be set in a number of ways known to those of skill in the art, such as with external components (not shown), built-in components, etc.

Diode D1 operates to restrict a charging current to flow from node 10 through inductor L1 rather than to ground (GND). The duty cycle of SS therefore controls Vout. Buck converters are known to be very efficient when the output voltage and the input voltage are relatively close and the duty cycle of the switching signal is high. Under these conditions the conduction angle is maximized and commutation losses are small relative to the power transmitted.

Where a relatively large voltage has to be bucked down to a relatively small voltage (e.g., 24 VDC to 3.3 VDC) the switching duty cycle is very small. This is illustrated in FIG. 1B which shows the voltage at node 10 of FIG. 1A over time under these circumstances. In this case the transitions are at relatively high voltage, high current and the efficiency becomes low. Thus where the switching duty cycle is less than about 50%, it is inadvisable from an efficiency point of view to use the buck circuit of FIG. 1A.

The single-ended forward circuit of FIG. 2 provides a solution. In the circuit of FIG. 2 transformer T1 utilizes a conventional turns ratio approach to step down the voltage on the secondary from that of the primary, much like in an AC circuit. This approach provides the flexibility of the turns ratio of the transformer and permits high duty cycles with low current commutations. It has a number of drawbacks, however. First, the circuit is made more complex and expensive by the presence of the transformer T1. It would be desirable to have a circuit not requiring a transformer for cost, size and complexity reasons. Second, the transformer in these sort of pulsed DC applications becomes saturated and requires time to recover. This, in turn, means that there is no power transfer during the recovery period, which requires larger, more expensive components to transfer the energy within a shorter time. It also results in the application of a voltage larger than Vin to the transistor Q1 which means that more expensive higher voltage transistors are required.

Turning now to FIG. 3, a buck converter using synchronous rectification is shown in schematic. In this synchronous version of the circuit of FIG. 1A, two switches, operated out of phase with one another (SS1 and SS2 are preferably 180 degrees out of phase with one another) are used instead of a switch and a diode. This provides a modest efficiency gain because the voltage drop on Q2 (FIG. 3) can be reduced over the voltage drop of D1 (FIG. 1A), say from 0.5V to 0.1V. The circuit also suffers, however, when low duty cycle switching is used to accomplish large voltage reductions. Accordingly, it would be desirable to provide a more efficient circuit for DC—DC power conversion of relatively large input to output voltage ratios without using a transformer.

SUMMARY OF THE INVENTION

A DC—DC power converter circuit for converting relatively high input voltages to relatively low output voltages employs a buck-type circuit topology with a multiple winding inductor. An optional winding is provided to the inductor to clamp a voltage spike appearing on the drain of one of the switching devices. Optionally, two inductor windings may be capacitively coupled for better efficiency.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons after a perusal of this disclosure.

Figure 1A:
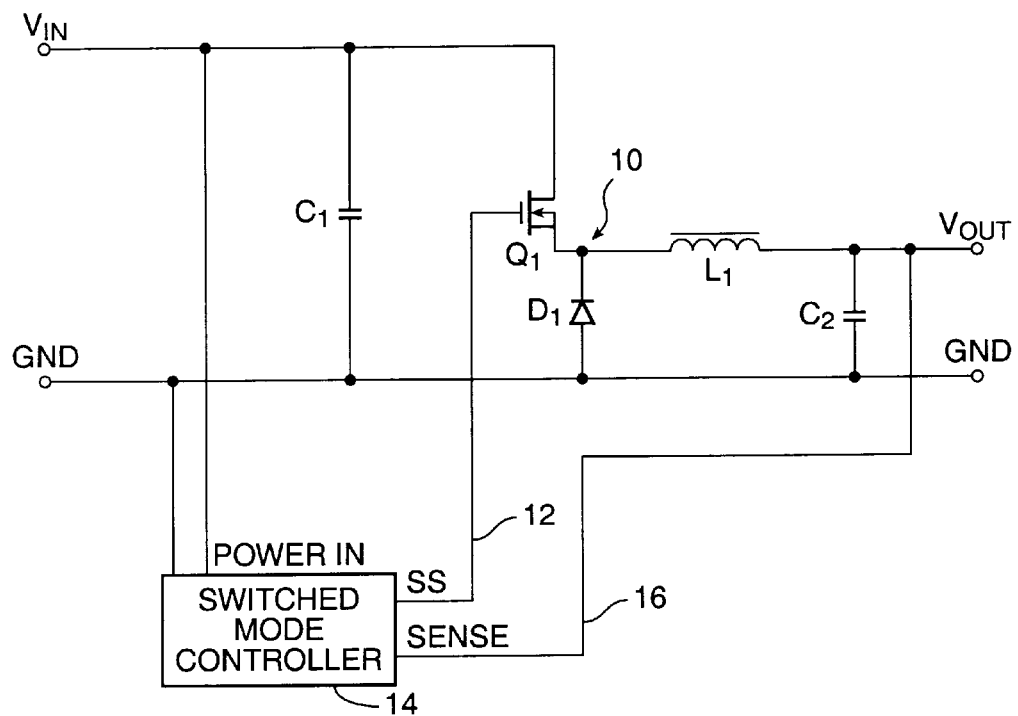
FIG. 1A is an electrical schematic diagram of a buck converter circuit in accordance with the prior art.
Figure 1B:
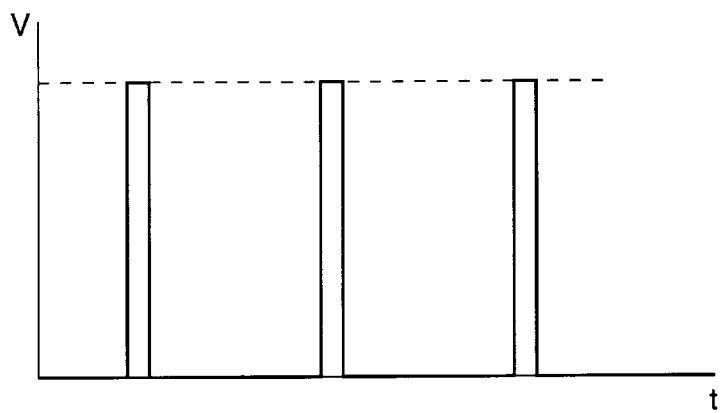
FIG. 1B is a plot of voltage vs. time for node 10 of FIG. 1A under low duty cycle switching conditions.
Figure 2:
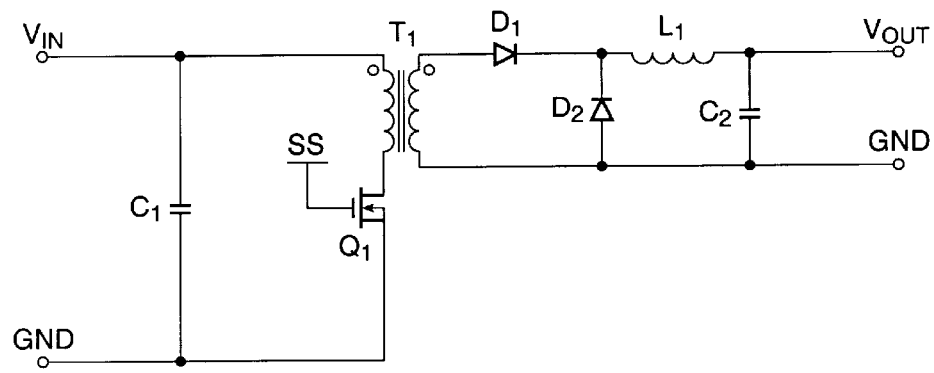
FIG. 2 is an electrical schematic diagram of a single ended forward buck converter circuit in accordance with the prior art.
Figure 3:
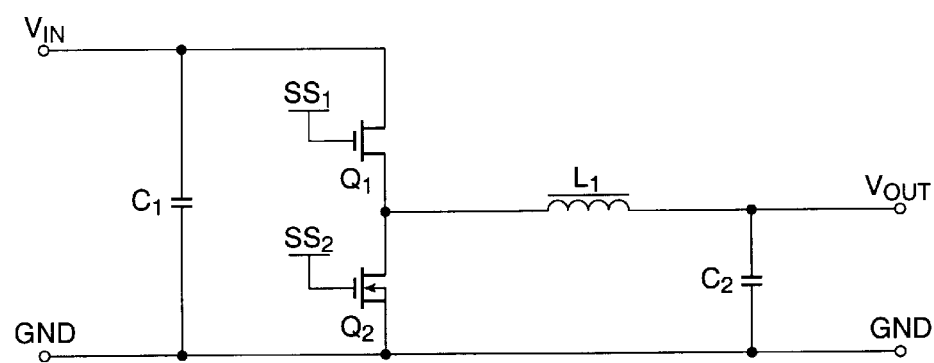
FIG. 3 is an electrical schematic diagram of a buck converter circuit utilizing synchronous rectification in accordance with the prior art.
Figure 4:
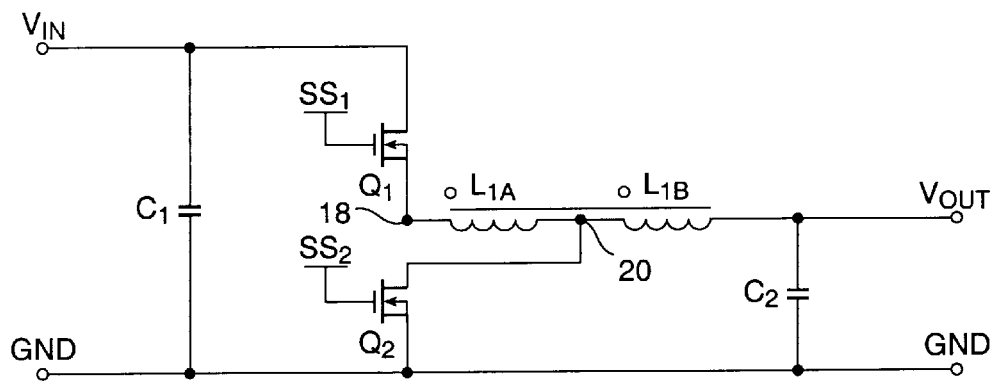
FIG. 4 is an electrical schematic diagram of a buck converter in accordance with a first embodiment of the present invention.

A first embodiment of the present invention is depicted schematically in FIG. 4. In this circuit a center-tapped inductor L1 (L1a+L1b) is provided. Charging of the inductor L1 (L1a+L1b) is done with more turns (i.e., those of L1a and L1b) than discharging which is done with less turns (i.e., just L1b) which will increase the "on" duty cycle and reduce the input current. In the FIG. 4 embodiment, a DC input voltage is applied between Vin and GND terminals. These are preferably filtered by a capacitor C1 disposed between Vin and GND. GND may be any fixed potential such as ground (O VDC) or any other value. A synchronous switching circuit as in FIG. 3 is used. A switched mode controller (not shown in FIG. 4) preferably provides 180 degree out of phase switching signals SS1 and SS2 to the gates of Q1 and Q2, respectively. Q1 and Q2 are switching devices such as MOSFETs or equivalent electrical switches. They may be P-channel or N-channel devices although N-channel devices are shown in the FIGs. L1a and L1b together comprise a center-tapped inductor. The center tap is connected to the drain of Q2 while its source is connected to GND. The drain of Q1 is connected to Vin and its source is connected to one end of L1a opposite the center tap (node 18). The end of L1b opposite the center tap is connected to Vout and capacitor C2 is disposed between Vout and GND.

This approach works well for a P-channel Q1 but it gives gate drive problems for an N-channel Q1 because the source of Q1 (node 18) has to go negative because of the inductive coupling between L1a and L1b. The node 18 in this circuit can thus be negative (less than GND) when the node 20 is close to GND. Moving L1a to the drain of Q1 solves this problem as in FIG. 5 as the source of Q1 will no longer go negative.

Note that where a p-type device, such as a P-Channel MOSFET or a PNP Bi-polar transistor, is used for Q1, the normal signal used for driving the gate of the device would be inverted with respect to the signal used to drive the gate of an N-Channel device such as a MOSFET.

Figure 5:
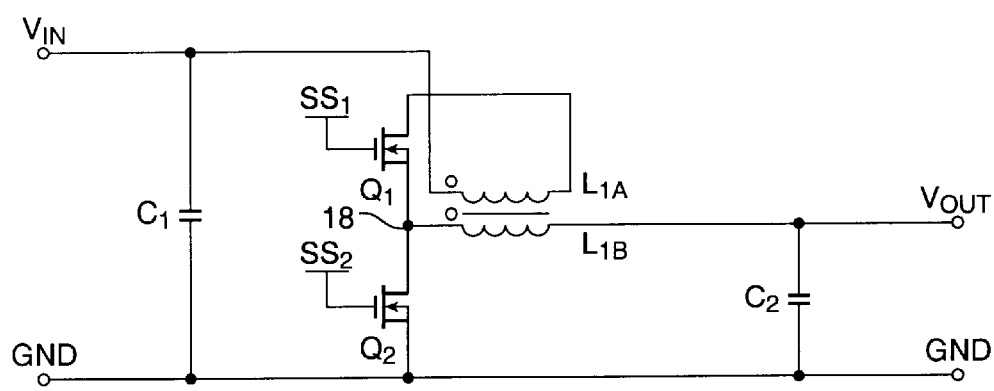
FIG. 5 is an electrical schematic diagram of a buck converter in accordance with a second embodiment of the present invention.
Figure 6:
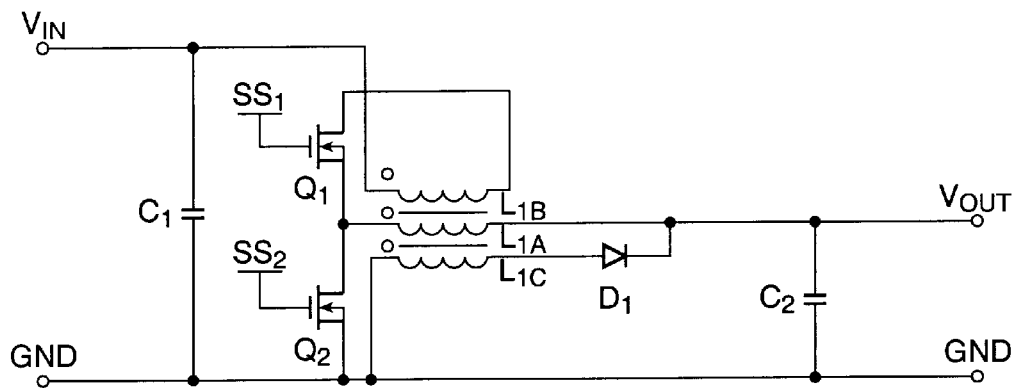
FIG. 6 is an electrical schematic diagram of a buck converter in accordance with a third embodiment of the present invention.

Turning now to FIG. 5, L1a has been relocated between the drain of Q1 and Vin. The dots on the schematic diagram show the phasing of the inductor windings. The inductor windings are all coupled as shown and wound on the same magnetic core, such as a torroid. The relocation of L1a solves the shoot through problem (direct cross conduction between Vin and Q1 and Q2) because there is now a winding impedance (L1a) in series with Vin, Q1 and Q2. This configuration solves the gate drive problems for Q1. The effect of the different numbers of turns for charge and discharge remains the same. This configuration requires less voltage gate drive for Q1 than the FIG. 4 embodiment. On the other hand, the drain of Q1 will see a commutation voltage spike due to the leakage inductance of the two windings L1a and L1b. Q1, in avalanche mode, can clamp this spike with a small efficiency loss.

Where efficiency is a major concern, additional gains can now be made. Turning now to FIG. 6, a third winding L1c tightly coupled with the first winding L1a is used to clamp the voltage spike at Q1 and send its energy to the output of the converter instead of letting it be dissipated in Q1. Thus L1c picks up the energy from L1a and passes it to Vout through diode D1.

Figure 7:
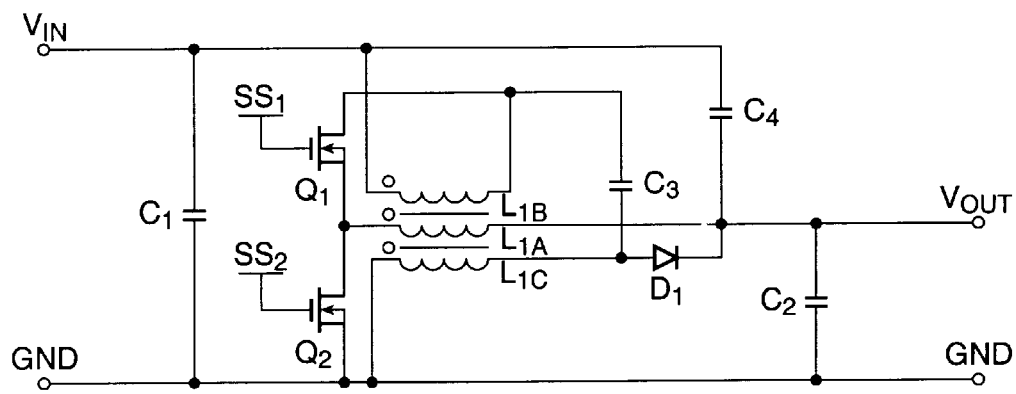
FIG. 7 is an electrical schematic diagram of a buck converter in accordance with a fourth embodiment of the present invention.

Since the phasing of L1b and L1c is the same, it is now possible to capacitively couple L1b and L1c which will provide an improved coupling over the magnetic coupling between these two windings shown in FIG. 6. Turning now to FIG. 7 capacitor C3 couples L1b and L1c. C4 provides a shorter return for the C3 current which otherwise would have to go through C2, the ground connection and then through C1.

The voltage spike at Q1 will be essentially perfectly clamped and its energy transferred to the output. Thus a relatively simple circuit provides for elimination of shoot through, a low input current and low gate voltage without the need for a transformer. At an operating frequency of about 1 MHz, the output capacitors necessary for a fast step response will easily filter any increased output ripple current. A multi-phase solution may also be used to reduce both input and output ripple currents, if desired. Those of ordinary skill in the art can choose component values and voltage and power ratings based upon desired system voltage, current, performance and tolerance ratings. Note that to be able to capacitively couple the windings L1b and L1c, all of L1a, L1b and L1c must have the same number of turns.

Alternative Embodiments

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A DC—DC synchronous converter, comprising:

an input voltage node for connecting to an input voltage;

an output voltage node for providing an output voltage;

a fixed voltage node, such as ground;

a first switching device having a first switching input, a first terminal and a second terminal;

a second switching device having a second switching input, a first terminal and a second terminal; and an inductor having a series connected first winding and second winding, said first winding having a first number of turns and said second winding having a second number of turns, said inductor including a center tap connected to said first winding and said second winding, an input connected to said first winding and an output connected to said second winding, said first terminal of said first switching device connected to said input voltage node;

said inductor input coupled to said second terminal of said first switching device;

said second terminal of said second switching device connected to said fixed voltage node;

said first terminal of said second switching device connected to said center tap; and said output of said inductor connected to said output voltage node.

2. A converter according to claim 1, wherein:
said first switching device is an N-Channel MOSFET.

3. A converter according to claim 1, wherein:
said first switching device is a P-Channel device.

4. A converter according to claim 3, wherein:
said P-Channel device is a bi-polar transistor.

5. A DC—DC synchronous converter, comprising:

an input voltage node for connecting to an input voltage;

an output voltage node for providing an output voltage;

a fixed voltage node, such as ground;

a first switching device having a first switching input, a first terminal and a second terminal;

a second switching device having a second switching input, a first terminal and a second terminal; and an inductor having a first winding and a second winding, said first winding having a first number of turns and said second winding having a second number of turns, said first winding magnetically coupled to said second winding, each said winding having a first end and a second end, said first end of said first winding connected to said input voltage node;

said second end of said first winding connected to said first terminal of said first switching device;

said second terminal of said first switching device connected to said first terminal of said second switching device and to said first end of said second winding;

said second terminal of said second switching device connected to said fixed voltage node; and said second end of said second winding connected to said output voltage node.

6. A converter according to claim 5, wherein:
said first switching device is an N-Channel MOSFET.
7. A converter according to claim 5, wherein:
said first switching device is a P-Channel device.
8. A converter according to claim 7, wherein:
said P-Channel device is a bi-polar transistor.
9. A DC—DC synchronous converter, comprising:
an input voltage node for connecting to an input voltage;
an output voltage node for providing an output voltage;
a fixed voltage node, such as ground;
a first switching device having a first switching input, a first terminal and a second terminal;
a second switching device having a second switching input, a first terminal and a second terminal; and
an inductor having a first winding, a second winding and a third winding, said first winding having a first number of turns, said second winding having a second number of turns and said third winding having a third number of turns, said first, second and third windings magnetically coupled to one another, each said winding having a first end and a second end, said first ends being all of the same polarity and said second ends being all of the opposite polarity to said first ends, said first end of said first winding connected to said input voltage node;

said second end of said first winding connected to said first terminal of said first switching device;

said second terminal of said first switching device connected to said first terminal of said second switching device and to said first end of said second winding;

said second end of said second winding connected to said output voltage node;

said second terminal of said second switching device connected to said fixed voltage node;

said first end of said third winding connected to said fixed voltage node;

said second end of said third winding connected to the anode of a diode; and a cathode of said diode connected to said output voltage node.

10. A converter according to claim 9, wherein:
said first switching device is an N-Channel MOSFET.
11. A converter according to claim 9, wherein:
said first switching device is a P-Channel device.

12. A converter according to claim 11, wherein:
said P-Channel device is a bi-polar transistor.
13. A DC—DC synchronous converter, comprising:
an input voltage node for connecting to an input voltage;
an output voltage node for providing an output voltage;
a fixed voltage node, such as ground;
a first switching device having a first switching input, a first terminal and a second terminal;
a second switching device having a second switching input, a first terminal and a second terminal; and
an inductor having a first winding, a second winding and a third winding, said first winding having a first number of turns, said second winding having a second number of turns and said third winding having a third number of turns, each said winding having a first end and a second end, said first ends being all of the same polarity and said second ends being all of the opposite polarity to said first ends; and said first end of said first winding connected to said input voltage node;

said second end of said first winding connected to said first terminal of said first switching device and to a first lead of a first capacitor;

said second terminal of said first switching device connected to said first terminal of said second switching device and to said first end of said second winding;

said second end of said second winding connected to said output voltage node;

said second terminal of said second switching device connected to said fixed voltage node;

said first end of said third winding connected to said fixed voltage node;

said second end of said third winding connected to the anode of a diode and to a second lead of said first capacitor; and a cathode of said diode connected to said output voltage node.

14. A converter according to claim 13, wherein:
said first switching device is an N-Channel MOSFET.
15. A converter according to claim 13, wherein:
said first switching device is a P-Channel device.
16. A converter according to claim 15, wherein:
said P-Channel device is a bi-polar transistor.
17. A converter according to claim 13, further comprising a second capacitor connected between said input voltage node and said output voltage node.
18. A converter according to claim 17, wherein:
said first switching device is an N-Channel MOSFET.
19. A converter according to claim 17, wherein:
said first switching device is a P-Channel device.
20. A converter according to claim 19, wherein:
said P-Channel device is a bi-polar transistor.
21. A converter according to claim 17, further comprising a third capacitor connected between said second end of said second winding and said second end of said third winding.
22. A converter according to claim 21, wherein:
said first switching device is an N-Channel MOSFET.
23. A converter according to claim 21, wherein:
said first switching device is a P-Channel device.
24. A converter according to claim 23, wherein:
said P-Channel device is a bi-polar transistor.

* * * * *